Apr. 24, 1923.  1,452,711
F. A. SCHROEDER ET AL
BRICK HANDLING APPARATUS
Filed Dec. 23, 1920  13 sheets-sheet 1
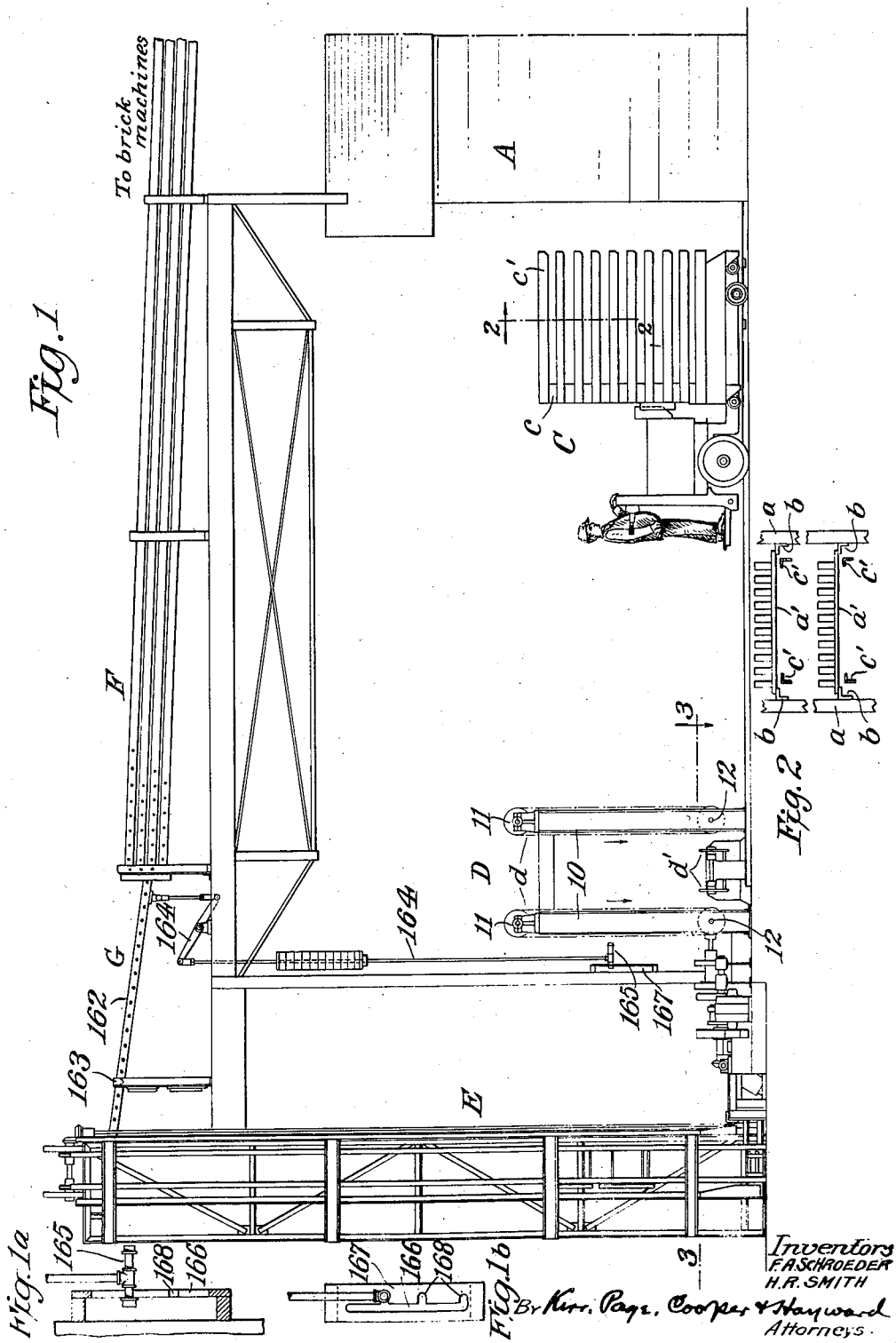

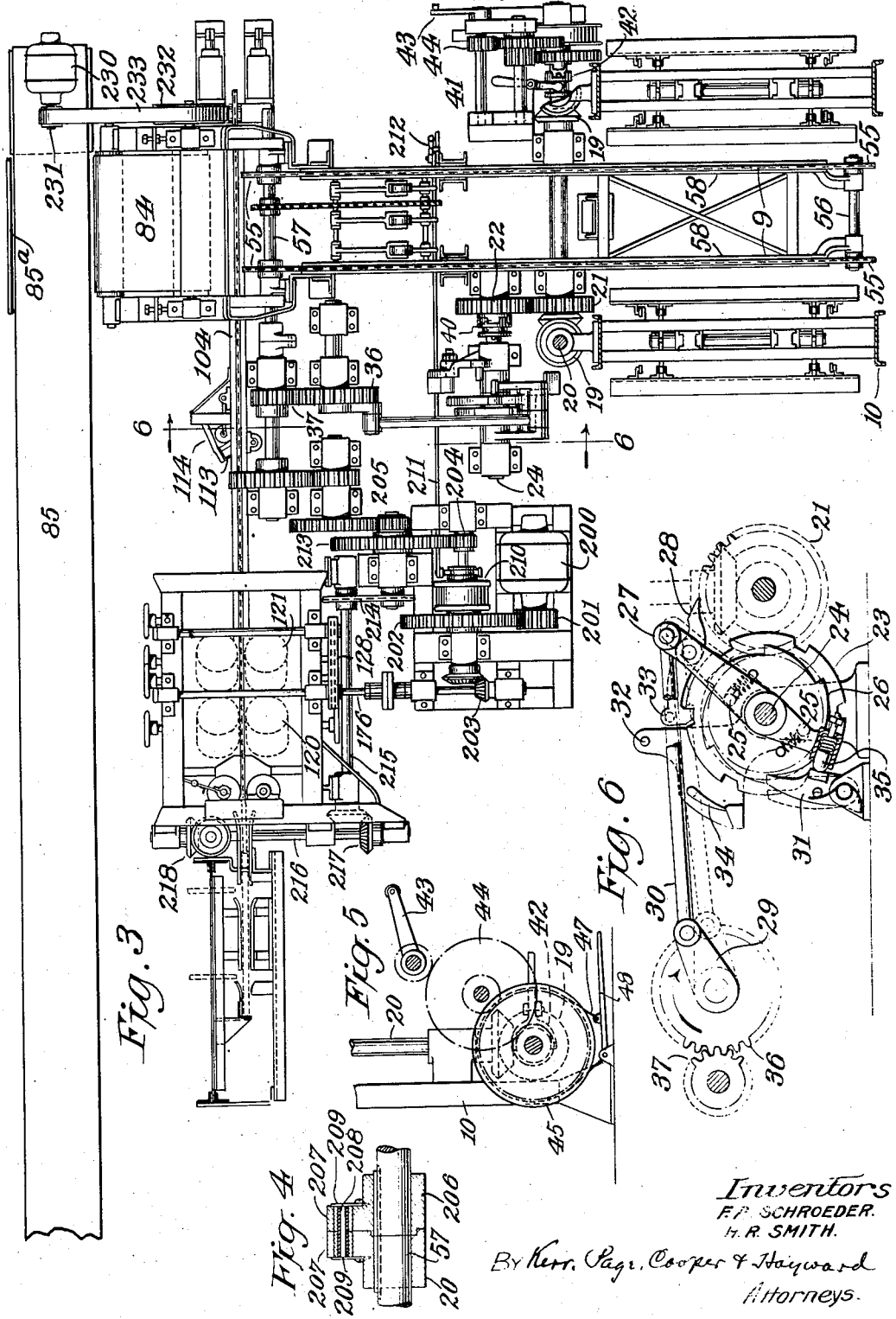

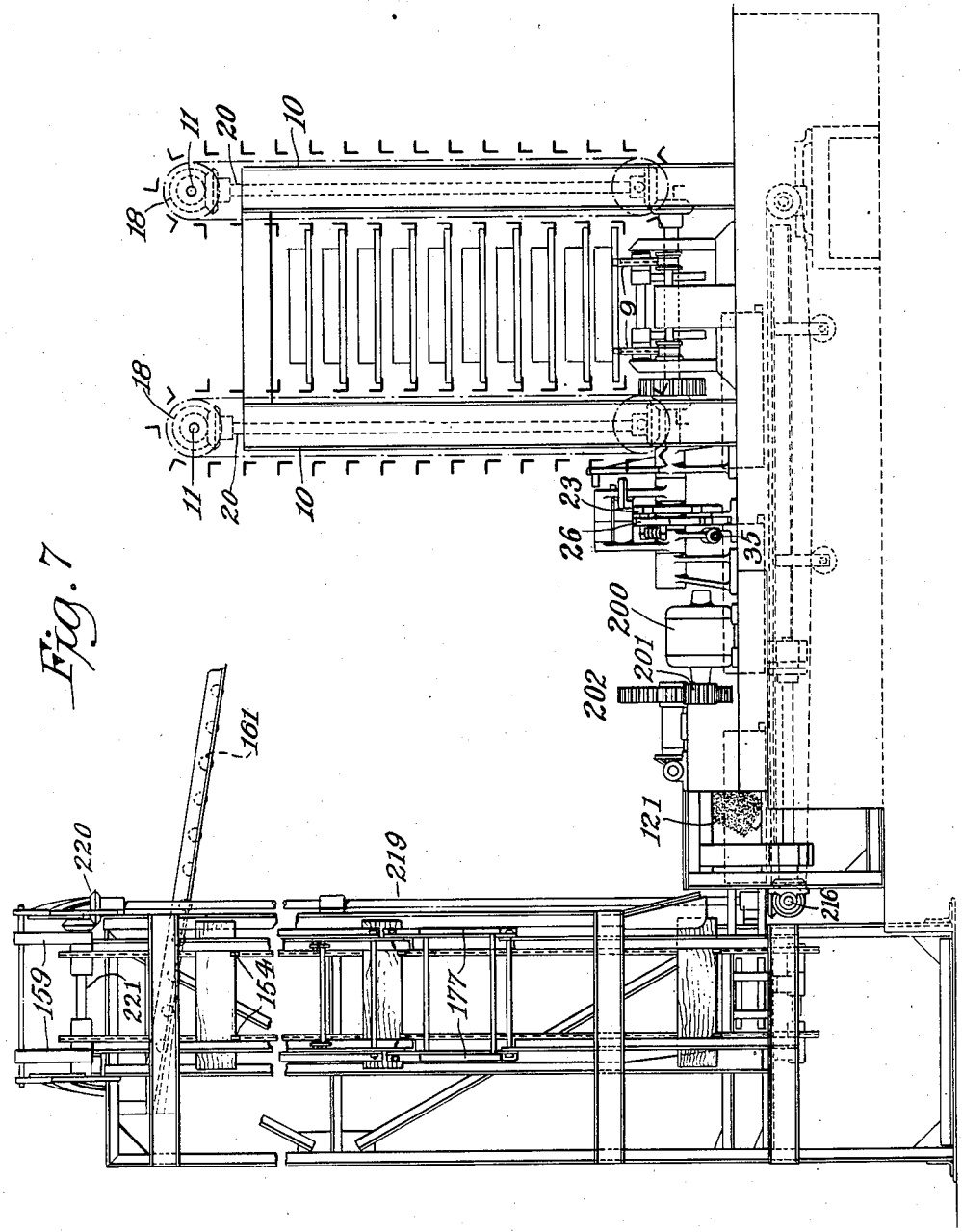

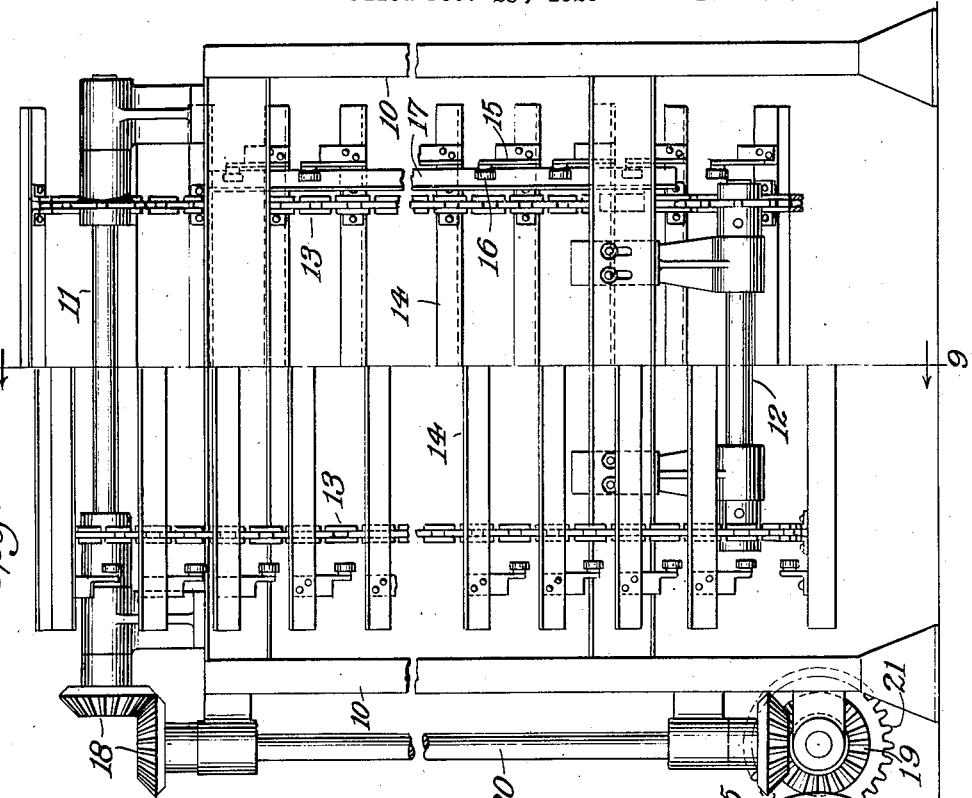
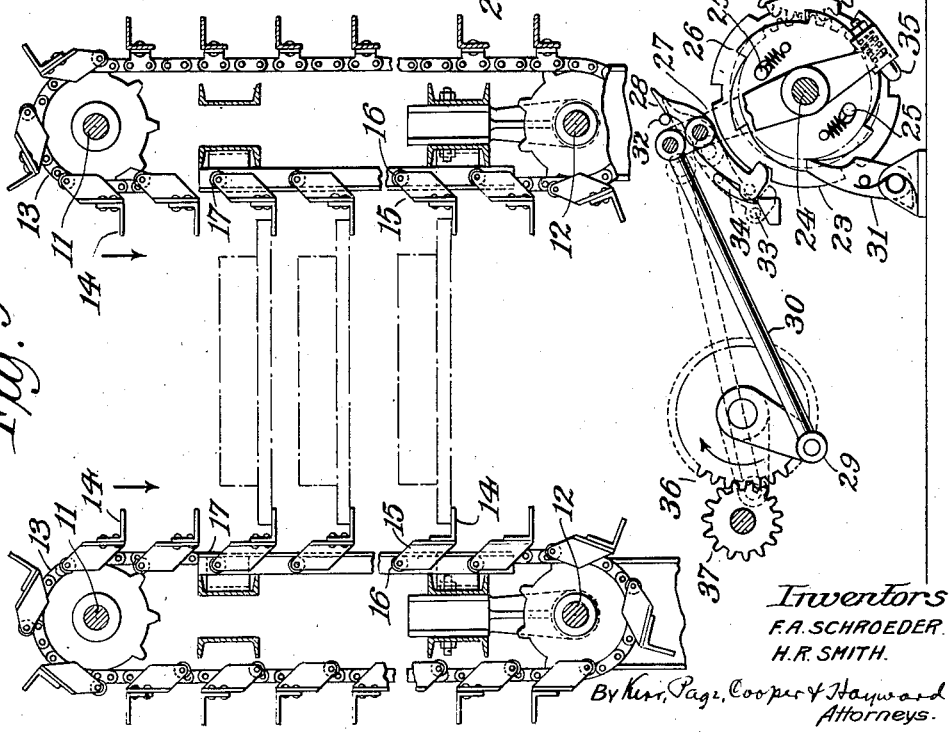

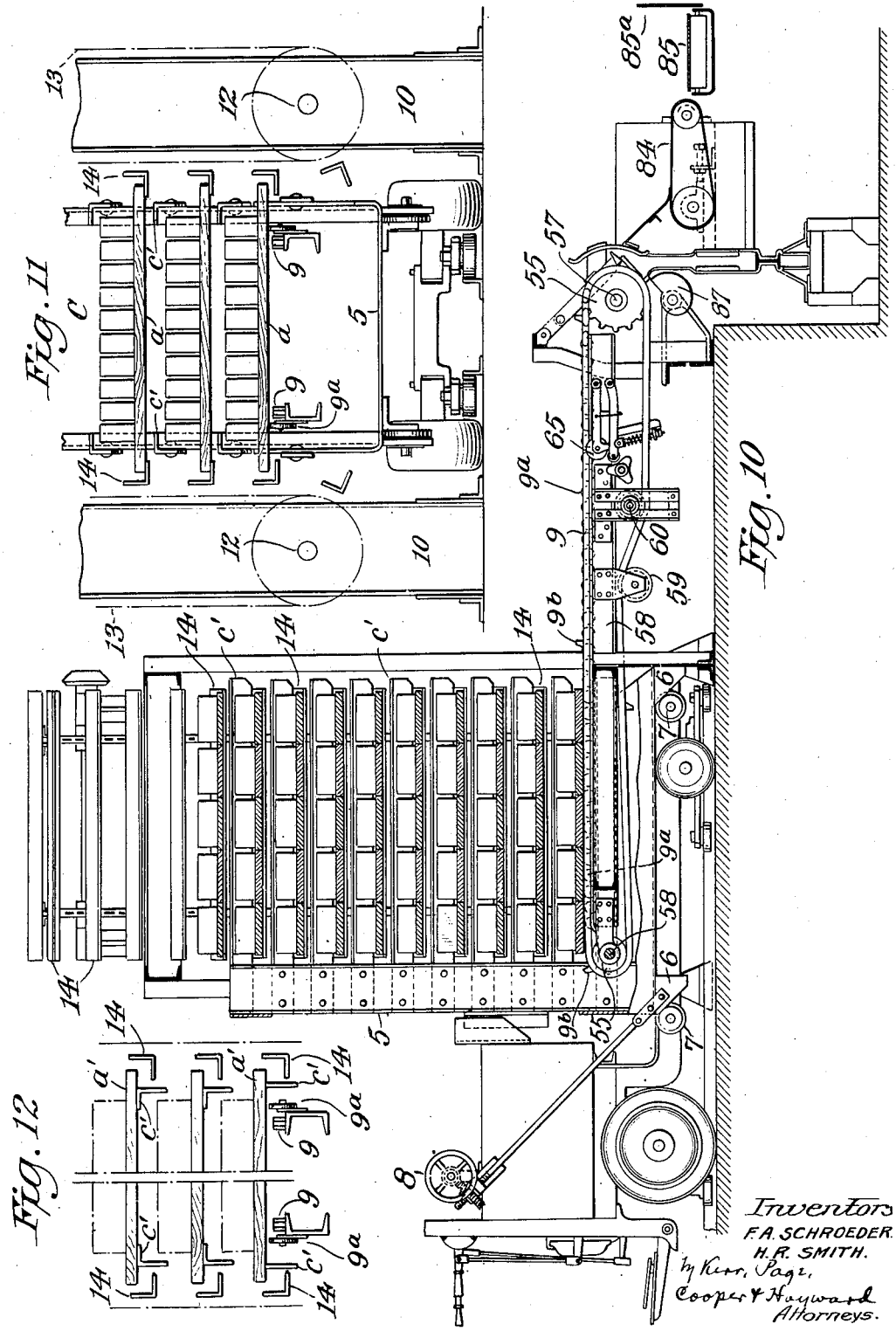

Apr. 24, 1923.

F. A. SCHROEDER ET AL 1,452,711

BRICK HANDLING APPARATUS

Filed Dec. 23, 1920      13 sheets-sheet 6

Inventors
F.A. SCHROEDER
H.R. SMITH
By Kerr, Page, Cooper & Hayward
Attorneys.

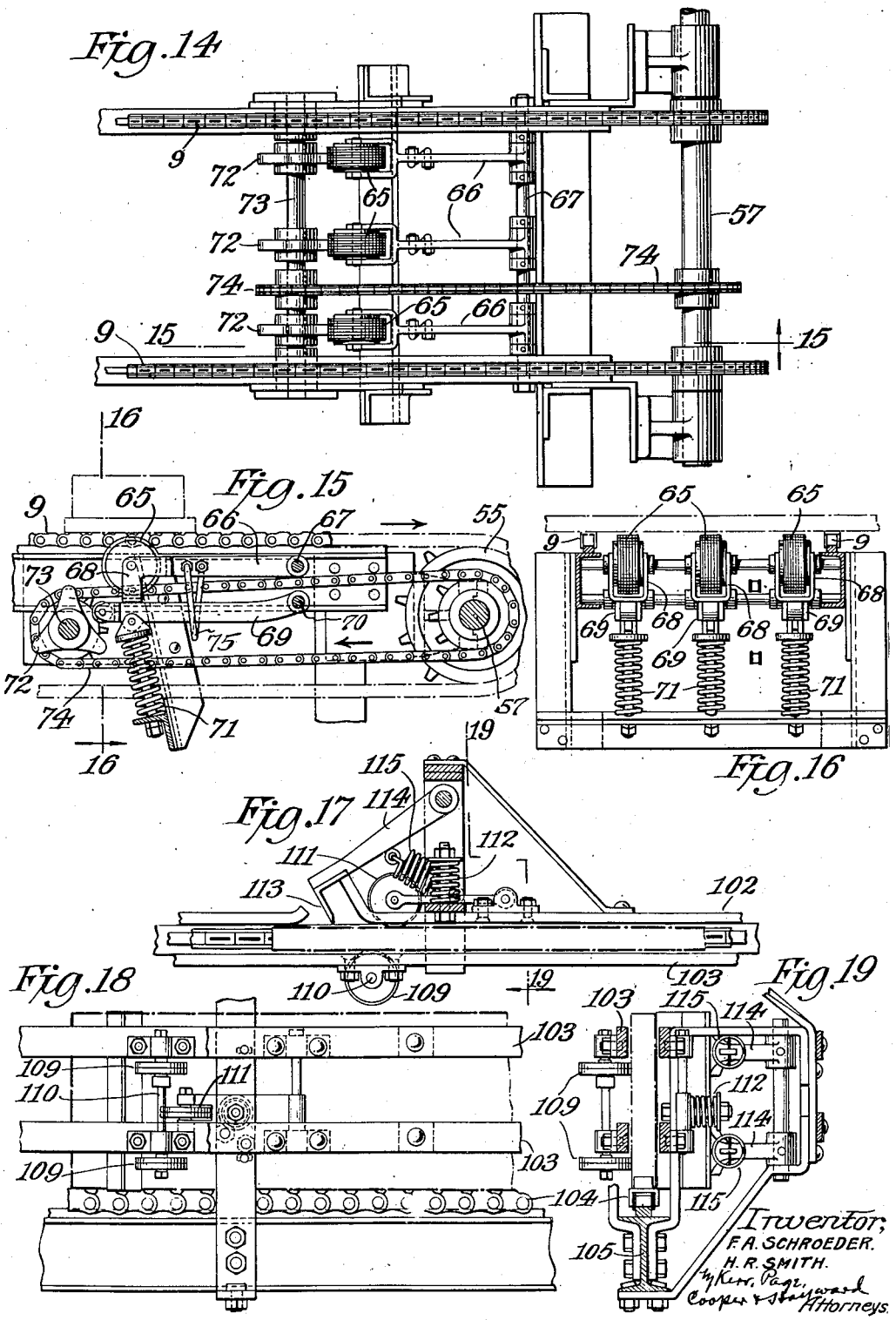

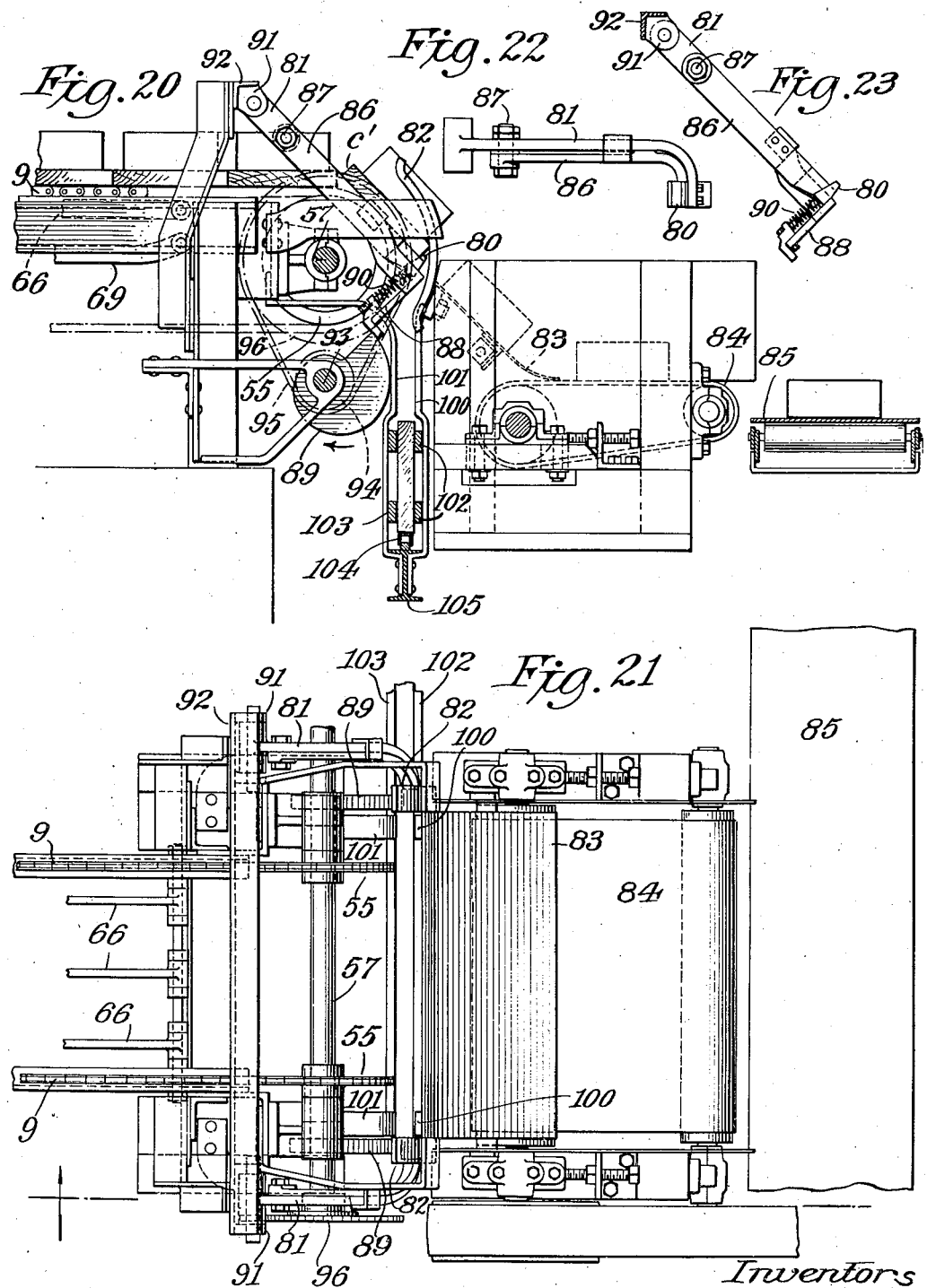

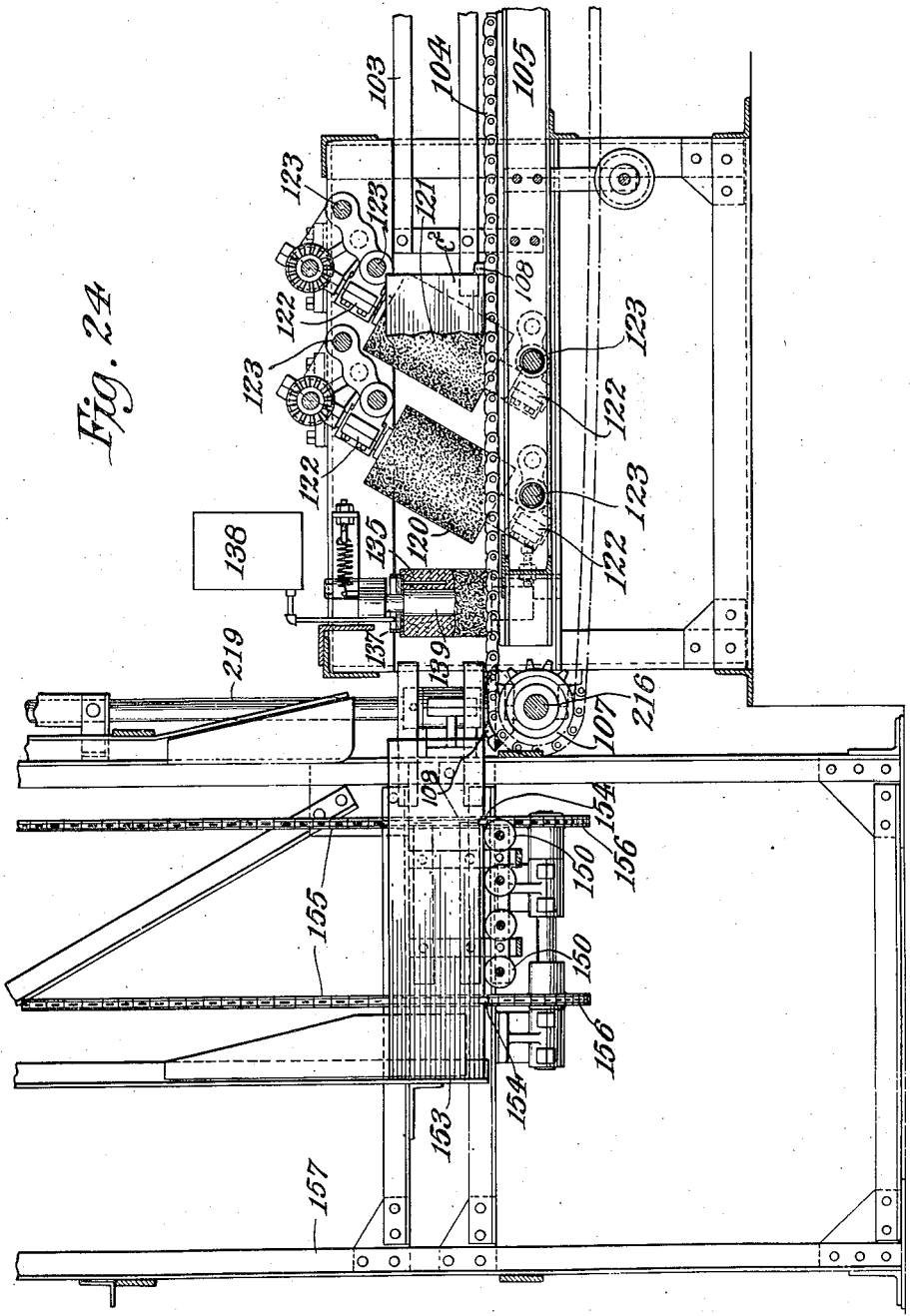

Apr. 24, 1923.
1,452,711
F. A. SCHROEDER ET AL
BRICK HANDLING APPARATUS
Filed Dec. 23, 1920     13 sheets-sheet 10
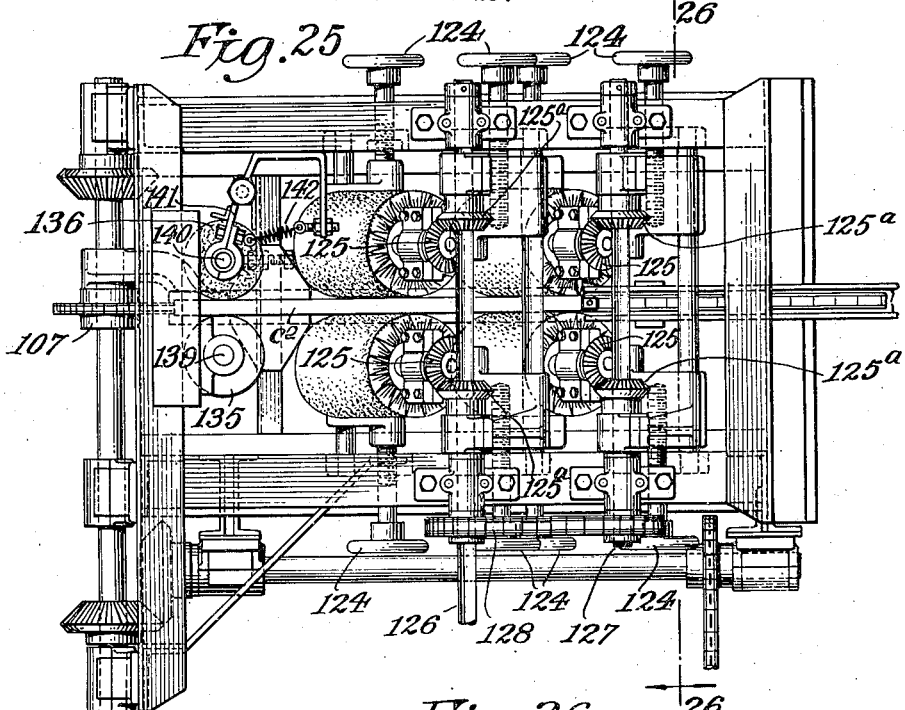
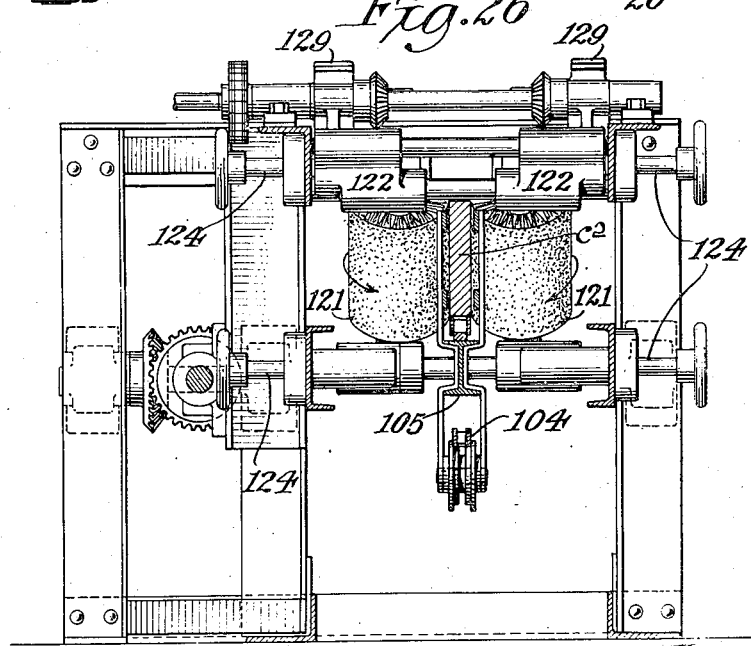
Inventors
F. A. SCHROEDER
H. R. SMITH
By Kerr, Page, Cooper & Hayward
Attorneys.

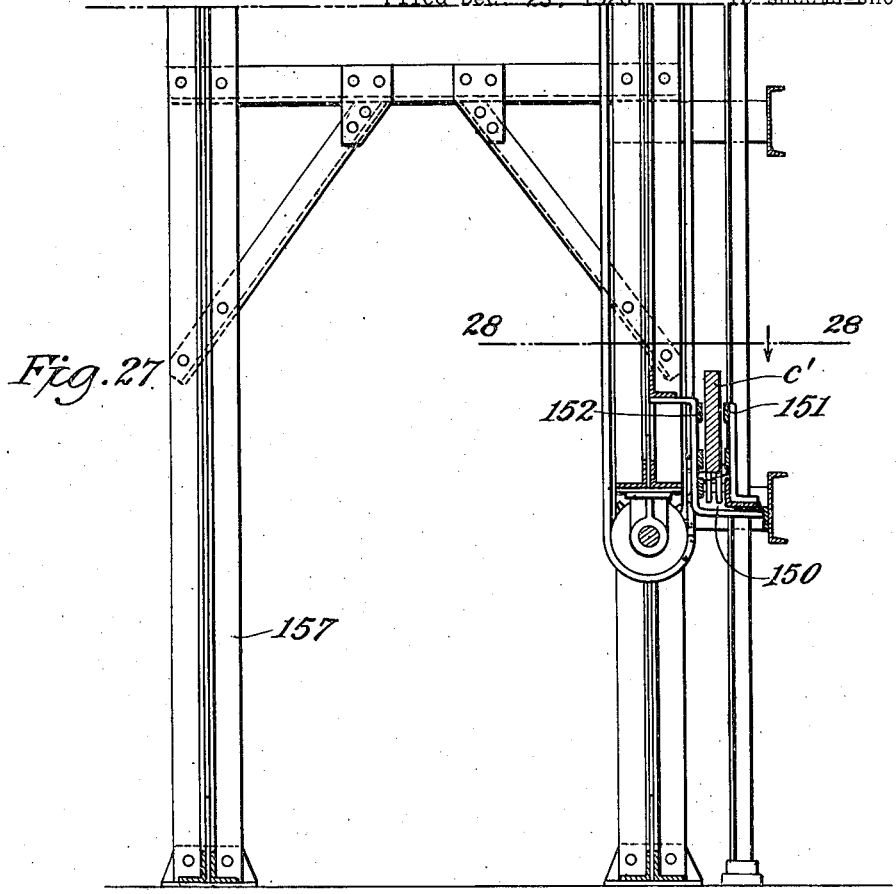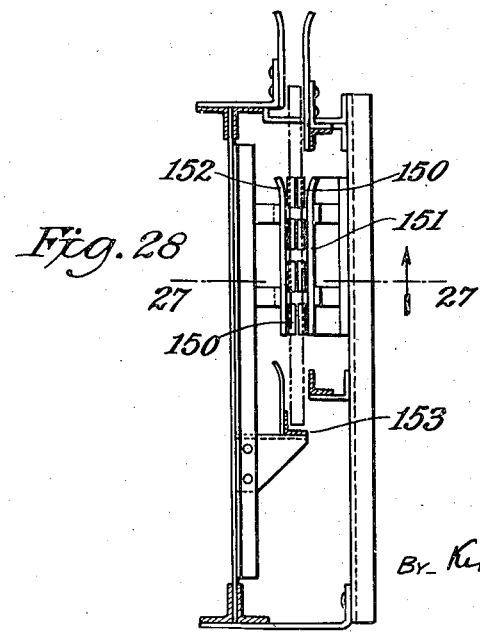

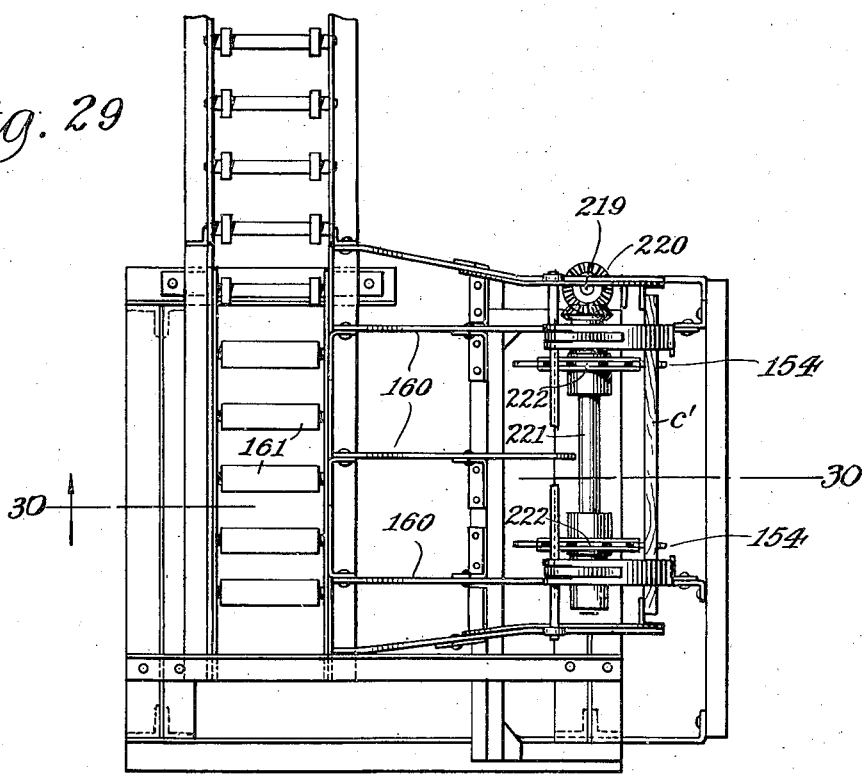
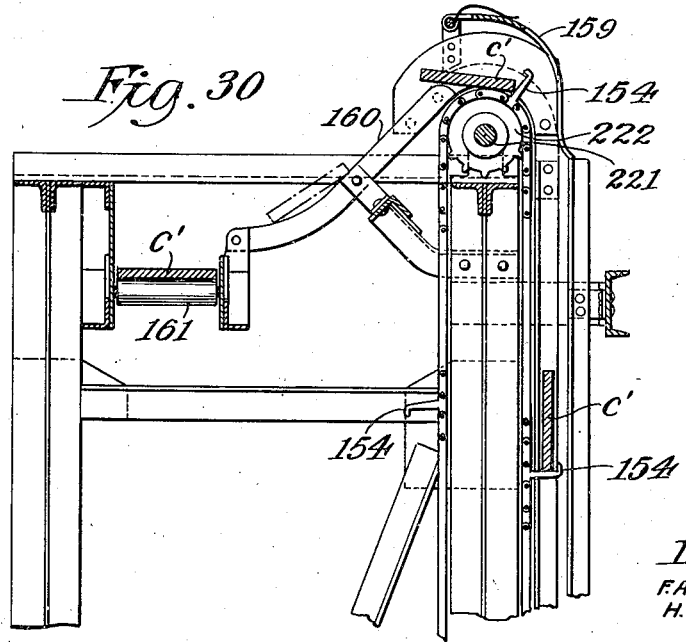

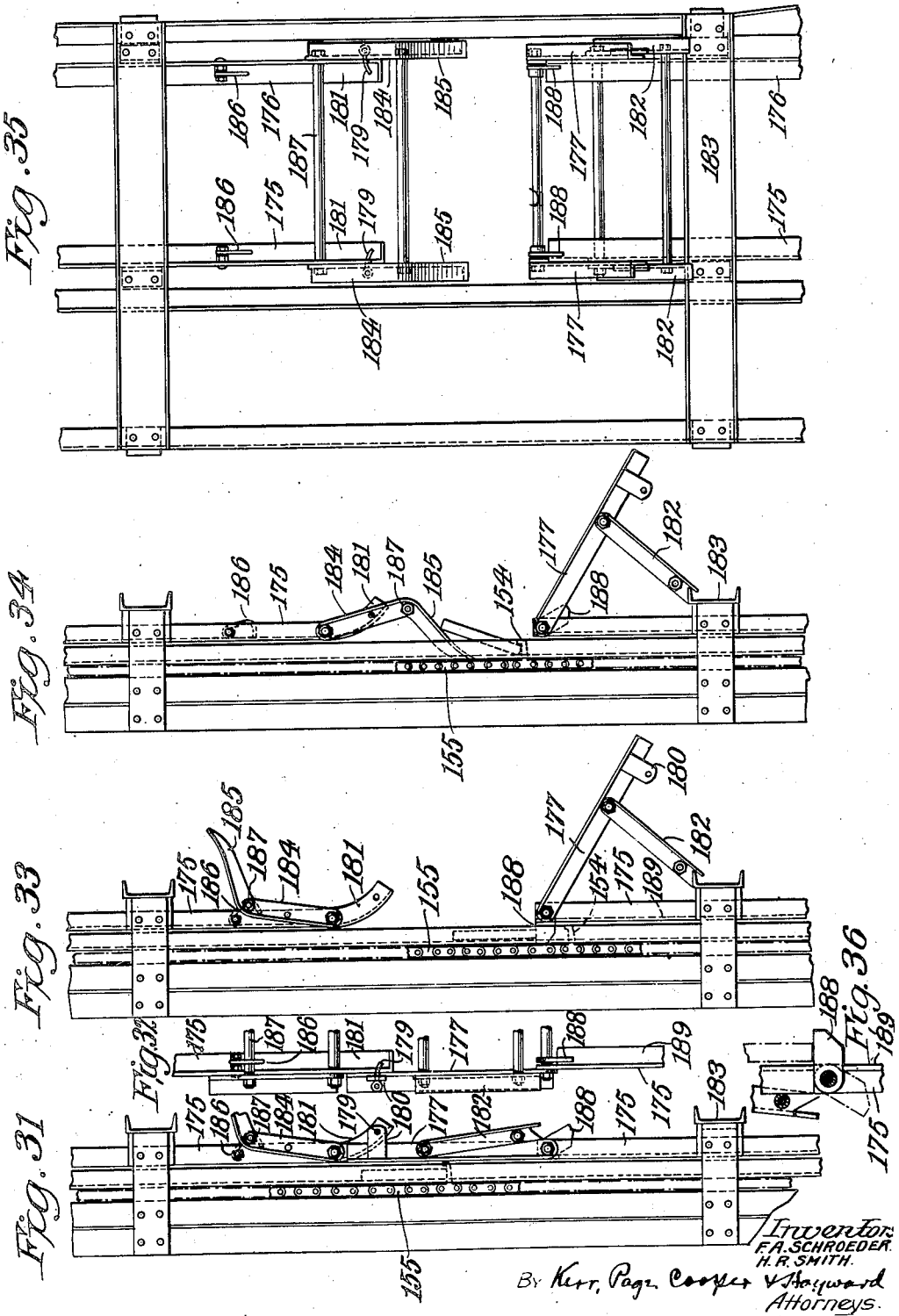

Patented Apr. 24, 1923.

1,452,711

UNITED STATES PATENT OFFICE.

FREDERICK A. SCHROEDER, OF BOGOTA, NEW JERSEY, AND HERMAN R. SMITH, OF BROOKLYN, NEW YORK, ASSIGNORS TO RAYMOND CONCRETE PILE COMPANY, OF NEW YORK, N. Y., A CORPORATION OF NEW JERSEY.

BRICK-HANDLING APPARATUS.

Application filed December 23, 1920. Serial No. 432,685.

*To all whom it may concern:*

Be it known that we, FREDERICK A. SCHROEDER and HERMAN R. SMITH, both citizens of the United States of America, residing at Bogota, in the county of Bergen and State of New Jersey, and Brooklyn, in the county of Kings and State of New York, respectively, have invented certain new and useful Improvements in Brick-Handling Apparatus, of which the following is a full, clear, and exact description.

This invention relates to apparatus for handling and transporting brick, as for example from a shed, kiln or other chamber in which the bricks are dried or cured, to a place of storage. More especially it relates to apparatus adapted for use with bricks which in the curing kiln rest on pallets or similar movable supports of uniform length. Its chief object, briefly stated, is to provide for the purpose indicated an efficient and reliable apparatus by which costly manual labor can be dispensed with to a considerable extent, thus materially decreasing one of the important factors in the ultimate cost of the brick. To this and other ends the invention consists in the novel features and combinations hereinafter described.

In its preferred embodiment the invention is designed for use with concrete bricks carried on pallets. By "pallet" we mean a plate or board on which the bricks rest, usually side by side on edge. The number of bricks per pallet is of course immaterial, but ten is a convenient number. In the curing kiln or shed the brick-laden pallets extend transversely between upright side frames and are arranged one above the other with their ends resting on inwardly extending supports or brackets carried by the side frames. Hence if a pair of spaced fingers are thrust horizontally under a horizontal course of pallets and are then raised, the fingers will pick up the overlying pallets and lift them off of the brackets as a group. In practise a number of pairs of such fingers are employed, arranged one pair above another and all carried by one support capable of vertical movement, so that a plurality of pallets, say four or five or more, from each of several superposed courses can be removed from the stack at one time. The spaced fingers mentioned are mounted on a suitable truck which serves to carry the fingers and pallets to an unloader, where the pallets are deposited on a vertical conveyer. The latter carries the brick-laden pallets one at a time to a horizontal conveyer, which carries the pallets away and discharges the bricks upon another conveyer, while the unloaded pallets are received by still another conveyer and carried to an elevator. In transit the pallets are cleaned of adhering matter and are also oiled to prevent absorption of water from the next load of bricks. From the pallet-conveyer the pallets are received by an elevator which carries them to an elevated position, where they are delivered to a gravity conveyer for delivery to the reloading point.

The embodiment referred to above is illustrated in the accompanying drawings, in which Fig. 1 is a side view, somewhat diagrammatic, showing the curing shed, a truck advancing to remove the brick-laden pallets therefrom, the unloader for removing the pallets from the truck, the elevator for raising the pallets after the bricks have been removed therefrom, and the conveyor or conveyors for returning the pallets to the brick machines, not shown.

Fig. 1ª is a detail section and Fig. 1ᵇ is a detail front view of the devices provided to lock the pallet switch in position.

Fig. 2 is a detail cross section on line 2—2 of Fig. 1, showing how the brick-laden pallets in the curing shed or kiln are picked up by the truck fingers.

Fig. 3 is a sectional plan view about on line 3—3 of Fig. 1, on a larger scale.

Fig. 4 is a detail sectional view illustrating a breaking-pin construction employed with one of the shafts, which pin is adapted to break under predetermined overload and thereby prevent damage to the apparatus due to continued operation of a part or parts which may be jammed or otherwise unable to move with normal freedom.

Fig. 5 is a detail elevation, from the right of Fig. 3, illustrating the manual mechanism for actuating or controlling the unloader when desired.

Fig. 6 is a detail section on line 6—6 of Fig. 3, showing the intermittent power-drive mechanism for actuating the unloader.

Fig. 7 is an elevation looking from the bottom of Fig. 3.

Fig. 8 is a detail elevation, partly in vertical section, of the unloader and the power-drive therefor.

Fig. 9 is a detail cross section of the unloader, about on line 9—9 of Fig. 8.

Fig. 10 is a detail elevation, partly in section, showing the truck-fingers advanced into the unloader and lowered to deposit the brick-laden pallets onto the unloader chains.

Fig. 11 is a detail elevation from the right of Fig. 10.

Fig. 12 is a detail view similar to Fig. 11 but showing the truck-fingers before they are lowered, with the brackets of the unloader chains ready to receive the pallets when the fingers are lowered.

Fig. 14 is a detail plan view of the outer portion of the conveyor by which the pallets are carried away from the unloader, showing the hammers for rapping the underside of the pallets as they pass, to loosen the bricks and prevent them from sticking when the pallets are tilted to dislodge the bricks.

Fig. 15 is a section on line 15—15 of Fig. 14.

Fig. 16 is a section on line 16—16 of Fig. 15.

Fig. 17 is a detail plan view, partly in section, and Fig. 18 is a side view, of mechanism for scraping the pallets to remove adhering particles of concrete after the bricks have been removed.

Fig. 19 is a section on line 19—19 of Fig. 17.

Fig. 20 is a detail side view of the outer end of the conveyor provided to carry the brick-laden pallets away from the unloader, showing the manner of tilting the pallets to discharge the bricks and for delivering the pallets to the pallet-conveyor.

Fig. 21 is a plan view of the mechanism illustrated in Fig. 20.

Fig. 22 is a detail plan view and Fig. 23 is a detail side view partly in section, of one of the elements of the mechanism shown in Figs. 20 and 21.

Fig. 24 is a detail side view of the far end of the pallet conveyor, showing the pallet-cleaning and oiling mechanism, and showing also the lower portion of the pallet elevator.

Fig. 25 is a detail plan view of the pallet-cleaning and oiling mechanism.

Fig. 26 is a section on line 26—26 of Fig. 25.

Fig. 27 is a detail side view, partly in section on line 27—27 of Fig. 28, showing the lower part of the pallet-elevator, and the pallet-conveyor delivering a pallet thereto.

Fig. 28 is a detail horizontal plan view on line 28—28 of Fig. 27.

Fig. 29 is a detail plan view of the top of the pallet-elevator.

Fig. 30 is a section on line 30—30 of Fig. 29.

Fig. 31 is a detail front view of a part of the pallet elevator, showing in closed position the gate mechanism which may be provided at the lower part of the elevator to permit the discharge of pallets, or the insertion of pallets into the elevator at times when no pallets are being delivered to it at the bottom.

Fig. 32 is a detail side view of the parts illustrated in Fig. 31.

Figs. 33 and 34 are detail views similar to Fig. 31, but Fig. 33 showing the parts arranged to permit insertion of pallets and Fig. 34 showing the parts arranged to discharge pallets.

Fig. 35 is a side view of Fig. 34.

Fig. 36 is a detail sectional view, from the rear of Fig. 33, of one of the stops provided to hold the inserted pallets in position for engagement by the ascending elevator lugs.

Figure 13:
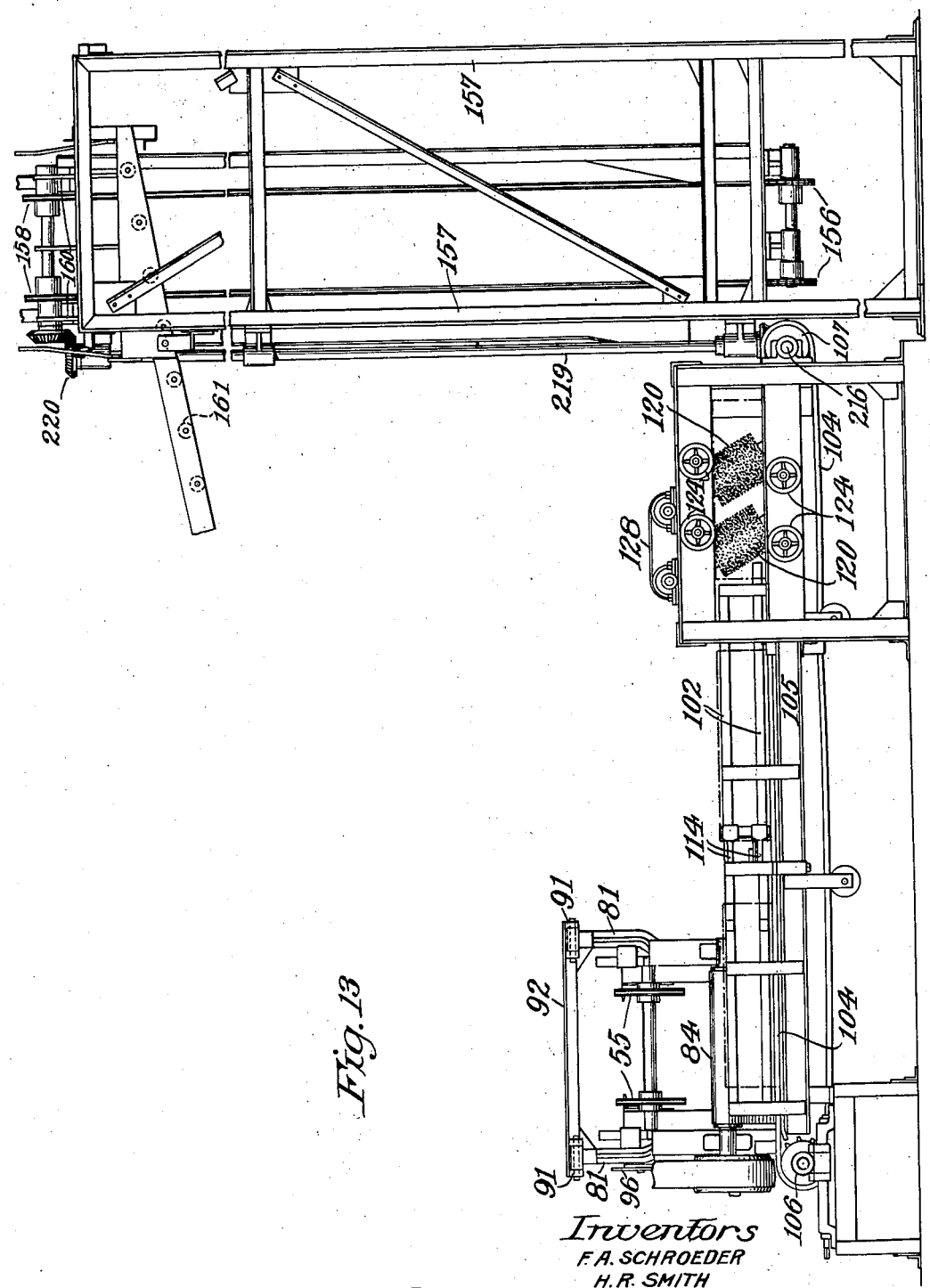
Fig. 13 is an elevation similar to Fig. 7 but from the other or rear side thereof.

The subjoined detailed description of the specific construction and operation of the various parts of the present embodiment of the invention will be more readily understood by the reader if he is first given a general explanation of the features of such embodiment in their broader aspects. For this purpose reference is made first to Fig. 1 of the drawings. In this figure A designates the end of a long narrow curing shed or chamber in which the pallets, laden with concrete bricks, are arranged transversely with their ends resting upon brackets carried by the side walls of the chamber or by suitable upright frames, as in Fig. 2, in which $a$, $a$ represent the side frames provided with brackets $b$ on which the brick-laden pallets $a'$ rest. It will be understood that the brackets extend longitudinally from one end of the kiln or chamber to the other end, so that each pair of brackets may support a horizontal series or course of pallets; and that the horizontal courses are spaced apart one above the other. C designates an electrically driven truck provided with a vertical adjustable standard $c$ having a number of horizontally projecting lifting fingers $c'$ adapted to underlie successive courses of pallets when the fingers are advanced into the chamber by the movement of the truck. In Fig. 2 the lifting fingers c' are shown in the relative positions which they occupy with respect to the overlying pallets. It will easily be seen that if, with the parts in the positions indicated in Fig. 2, the lifting fingers are raised, as by raising the standard c, the fingers will pick up the brick-laden pallets, and that when the truck is moved out of the shed the pallets which it picked up will be carried out with it.

The truck C, loaded with pallets as above described, is next brought to the unloader D in such position that the lifting fingers are extended into the space between conveyors d, provided with inwardly extending brackets (not shown in Fig. 1) upon which the pallets are deposited by lowering the fingers. The truck is then moved out, after which the unloading conveyors are given an intermittent or step-by-step motion in the direction of the arrows, with the result that successive groups of pallets, deposited upon the conveyors by the truck, are carried down upon a horizontal conveyor d' and are carried away from the unloader in a forward direction. As the successive pallets reach the end of the last mentioned conveyor they are tilted to discharge the bricks upon a short transfer belt by which they are in turn delivered to a conveyor arranged to carry them away to the selected place of storage or to some other apparatus for such further handling as may be necessary or desirable.

After the bricks are discharged upon the transfer belt above mentioned, the pallets themselves are delivered to another conveyor and are carried thereby past a station at which they are first thoroughly cleaned of adhering matter, such as particles of concrete, and after being next given a light brushing with oil or other waterproofing or decay-resisting material, they are transported to an elevator E by which they are raised to a point sufficiently high for delivery by gravity to the brick machines for re-use. The gravity conveyors for the latter purpose are indicated at F and may be of any number (in the present instance four) according to the number of brick machines in use. A movable switch G is provided, by which the pallets discharged at the top of the elevator may be delivered to any one of the gravity conveyors as may be necessary or desirable.

The truck C is illustrated more in detail in Figs. 10 and 11. The lifting fingers c' are attached by one end to the vertically movable standard in the form of a frame 5, equipped at the bottom with four triangular lifting cams 6 (one at each corner) cooperating with rollers 7. As the frame is drawn rearwardly by means of the worm and worm-gear mechanism 8 the cams ride up on the rollers and so lift the frame, and the fingers carried thereby. Reverse operation of the worm-gear mechanism allows the frame to descend, as will be readily understood, to the position shown in Fig. 10.

With the above general description in mind, the following detailed explanation will be readily understood.

The unloader, for taking the brick-laden pallets from the transporting truck and delivering them in successive groups to the horizontal conveyor, comprises a pair of laterally spaced upright frames 10, 10, having at top and bottom the horizontal shafts 11, 11, 12, 12 (Figs. 1, 9 and 10) provided with spaced sprockets for the conveyor chains 13, 13. The latter are provided with inwardly extending brackets composed of angle irons 14 attached to the chains in any convenient manner, to support the ends of the transversely extending pallets, as indicated in Fig. 9. The weight of the pallets tends, as will be evident from Fig. 9, to swing the brackets downwardly and hence allow the pallets to fall. To overcome this tendency the brackets are provided at their ends with ears 15, equipped with rollers 16 which in the descending reaches of the chains pass in rear of the angle irons 17. The rollers being in each case considerably above the point of attachment of the bracket to the chain, it will be seen that they effectually prevent rocking movement of the brackets in their downward travel and hence hold the brackets securely in the positions indicated in Fig. 9. When the fingers c' of the truck C are advanced into the unloader, the pallets are supported above the brackets 14, as in Fig. 12, but as the fingers are lowered the brackets are deposited on the brackets as in Figs. 10 and 11.

The conveyor 9, by which the brick-laden pallets are carried from the unloader, moves continuously, but evidently the motion of the unloader conveyors 13, actuated by the weight of the load thereon must be intermittent. For this purpose the shafts 11, 12 are connected by gearing 18, 19, vertical shafts 20, and gears 21, 22 (Figs. 3, 5, and 8) to suitable control mechanism illustrated in Figs. 6 and 8. This mechanism comprises a notched disk 23, fixed on shaft 24 and having a pair of pins 25 extending through slots in a ratchet disk 26 loose on the same shaft. A lever 27, loose on shaft 24, has a pivoted dog 28 to cooperate with disk 23 and is connected by a pitman 30 to the crank 29. It will be understood that the weight of the load on the unloading conveyors tends to rotate the disks 23 and 26 counterclockwise (Fig. 8) but that such movement is normally prevented by the holding pawl 31. As the crank 29 continues its movement in the direction of the arrow the tail of the dog 28 is cammed down by the stud 32, thereby swinging the stud 33 on the head of the dog past the gravity pawl 34 to the position indicated in dotted lines in Fig. 8. Passing the outer dead center the crank now advances the pitman 30, causing the stud 33 to ride up on the pawl 34 and thus be held out of engagement with the disk 23. Approaching the position shown in full lines in Fig. 6, the head of the dog drops into a notch, and, continuing its motion, turns the disk 23 clockwise a slight amount, enough to ease the load on pawl 31 to permit the same to be kicked out by the spring-actuated plunger 35 carried by the lower arm of lever 27. The load is now sustained wholly by the dog 28. As the crank 29 passes the inner dead center the dog begins to recede, allowing disk 23, ratchet 26 and shaft 24 to rotate counterclockwise. As the lower arm of lever 27 leaves the pawl 31 the latter swings over upon ratchet 26 to engage the approaching tooth as in Fig. 8. The cycle thus described is repeated at every revolution of crank 29, which is itself connected by means of gears 36, 37 to the main driving train, as will be explained more fully hereinafter. It will be understood that the parts, including the gearing 18, 19, are so proportioned that an angular movement of the ratchet 26 through an angle corresponding to the space between successive teeth is sufficient for a movement of the conveyors equal to the vertical spacing of the brackets 14.

At times it may be necessary or desirable to control the movement of the unloading conveyors by hand. In such case the clutch 40, Fig. 3, is thrown out, disconnecting the gear 22 from the power-control mechanism, and the clutch 41 is thrown in, connecting the manual control mechanism 42 with the associated gear 19. This mechanism comprises a crank 43, see also Fig. 5, connected to the appropriate member of clutch 42 by reducing gears 44, and a brake-drum 45. The latter is encircled by a brake-band 47 connected with a foot lever 48, by which the speed of descent of the conveyors may be controlled. The crank permits easy shifting of the conveyors, whenever necessary, into position for receiving the truck fingers $c'$.

The horizontal conveyor 9, by which the brick-laden pallets are carried away from the unloader, comprises a pair of chains running over spaced sprockets 55 on horizontal shafts 56, 57, Figs. 3 and 10. The upper reaches of the chains travel on longitudinal channel irons 58 to prevent sagging under load. To accommodate the inner end of the conveyor to the restricted space available in the truck (Fig. 10) the inner sprocket is of small diameter, while the outer sprockets 55 are of considerably larger diameter to facilitate tilting of the pallets to discharge the bricks and delivery of the pallets to the pallet-conveyor. To bring the inner portions of the lower reaches up as near as possible to the supporting members 58 each chain has a vertically stationary idler, as 59, over which it travels. Beyond the idlers 59 each chain has a vertically movable idler 60 under which it runs. The latter idlers are weighted, or are otherwise heavy enough to hold the outer portion of the reach in a substantially horizontal position, for the purpose of affording sufficient room for the pallet-bumpers described below.

The pallets are not deposited (by the unloader) directly upon the conveyor 9 but upon two series of rollers $9^a$, Figs. 10, 11 and 12, alongside of the conveyor. The pallets rest on these rollers until engaged in the rear by one of the pairs of dogs $9^b$ on the conveyor chains, by which they are carried forwardly off the rollers.

If the bricks are wet when they leave the brick machine and are deposited in that condition on the pallet they may adhere to the latter, even after they are dried or cured, and hence may not slide off the pallet when the same is tilted at the outer end of the conveyor 9. To obviate this difficulty, mechanism may be provided to give each pallet, as it passes on the conveyor, a smart blow or bump on its underside, thus freeing any brick or bricks that may be stuck in place. The mechanism referred to is illustrated in Figs. 3, 10, 14, 15 and 16, and comprises a plurality of bumpers or hammers each consisting of a roller 65 mounted in an arm 66 pivotally carried by a transverse shaft 67 below the upper reaches of the conveyor chains 9 near the outer shaft 57. The rollers named are preferably covered with rubber or other yielding material so that they will not injure the pallets. Each bumper arm has a downwardly extending finger 68 resting on an actuating arm 69 pivoted on a shaft 70 and urged upwardly by a coil spring 71. The arms 69 are themselves actuated by cams 72, fixed on a transverse shaft 73 driven from conveyor shaft 57 by a chain 74. As the cams revolve they engage arms 69 and depress the same, thereby compressing the springs 71, and as the arms escape the cams the springs expand suddenly and throw the arms upwardly, which in turn throw the bumpers 66 up against the underside of the pallet immediately above. The extent of the upward movement of the hammers or bumpers is limited by depending keepers 75, passing under the arms 69. The cams may be timed to actuate the several bumpers simultaneously or in any desired order.

Reaching the outer end of conveyor 9 (see Figs. 20, 21, 22, 23) the pallet tilts on the outer sprockets 55 to the position shown at $c'$ in Fig. 20, where it meets the stops 80, at the lower end of the swinging arms 81, and rests against the curved guides 82. The pallet being held momentarily in this tilted position the bricks slide off and upon the inclined apron 83, over which they pass to the rapidly moving transfer belt 84 and are shot thence upon the conveyor 85. A barrier 85ª (Fig. 10) prevents the bricks from being thrown beyond the conveyor. The stops 80 are carried on the lower ends of arms 86 pivoted at 87 on the arms 81, which latter have depending fingers 88 cooperating with the snail cams 89. When the drops in the cams reach the fingers 88 (in harmony with the dogs 9$^b$ on the conveyor, Fig. 10) the arms swing down by gravity and permit the pallet to continue its downward movement behind the guides 82. In some cases the pallet is further impelled by the oncoming pallet next in rear. Shortly after the arms 81 fall the cams raise them again to arrest the next pallet; but if their upward movement should happen to be out of time with the travel of the pallets, thus bringing the stops against the underside of the pallet instead of in front of its forward edge, the arms 86 are depressed against the tension of the spring 90 and no harm is done to the machine or to the pallet. When the cams again permit the stop-arms to fall, the pallet resumes or continues its downward travel, with or without an impulse from the next pallet. The arms 81 are pivoted between ears 91 on a transverse member 92 above the path of the pallets. The cams 89 are fixed on a transverse shaft 93, Fig. 20, driven by sprocket 94 and chain 95 from a large sprocket 96 on the conveyor shaft 57.

Freed from the stops 80 (Fig. 20) the pallet descends by gravity through the vertical front and rear guides 100, 101 (see also Fig. 21), thence through the horizontal front and rear guides 102, 103, and falls upon the pallet conveyor 104, the upper reach of which travels on an I-beam 105 to prevent sagging. This conveyor runs over sprockets 106, 107, Fig. 13, and is provided with lugs 108, Fig. 24, which engage the pallets and carry them leftwardly. Immediately beyond the transfer belt 84 (Fig. 3) the pallets pass in front of a pair of rollers 109 (Figs. 17, 18, 19) rotating on a fixed shaft 110, and behind a swinging roller 111 held yieldingly in position by a spring 112. Just beyond the rollers is a knife 113, mounted in swinging arms 114 and held against the pallet by springs 115, so that as a pallet passes, the surface on which the bricks rested will be scraped by the knife and thus cleaned of larger masses or particles of concrete or other material.

Beyond the scraper 113 (Fig. 3) the conveyor 104 carries the pallets between two sets of revolving wire brushes 120, 121 (Figs. 3, 13, 24, 25, 26) by which the pallets are brushed on both sides to remove all traces of dirt and other foreign matter, so as to leave them as smooth as possible, for subsequent use in the brick machines. The brushes revolve on inclined axes, as shown, and are journaled in bearings 122 which may be shifted in and out on the transverse carrier rods 123 by means of manually actuated screws 124 to vary the separation of the brushes and the effect thereof upon the pallets. The brushes are rotated by bevel gears 125 meshing with bevel gears 125ª slidably mounted on the splined shafts 126, 127, the latter being driven from the former by a chain 128. The gears 125ª are arranged between the arms 129 of the upper bearing members 122 so as to be shifted on their shafts in unison with said members by the screws 124. In Fig. 26 the pallet, designated $c^2$, is moving toward the observer and the brushes are rotating rapidly in the direction of the arrows.

Immediately beyond the brushes 120 the pallets on the conveyor 104 are carried between two oiling rollers 135, 136, composed of felt or other suitable material and each having at its upper end a perforated receptacle 137 receiving oil at a slow rate from a receptacle 138. See Figs. 24 and 25. The rollers are mounted on vertical shafts 139, 140, the former fixed in position and the latter mounted in swinging arms 141 which are urged rightwardly (Fig. 25) by springs 142 so as to hold the roller 136 in firm but yielding contact with the passing pallets. The latter are thus given a light coating of oil (or other waterproofing liquid if desired) so as to render them as nearly as possible impervious to moisture, and to thereby prevent warping, cracking, etc.

Arriving at the far end of conveyor 104 the pallets pass upon a horizontal supporting member composed of a series of rollers 150 arranged below the spaced horizontal guides 151, 152. See Figs. 24, 27 and 28. Immediately beyond the guides mentioned is a stop 153 to arrest the pallet in position to be engaged on its lower edge by fingers 154 on the elevator chains 155 traveling over lower sprockets 156 at the bottom of the upright structure 157 (which also supports the other parts named) and upper sprockets 158, Fig. 13. At the top of the elevator the pallets passing under the spring-actuated guide fingers 159 are pushed over upon the inclined guides 160 and slide down the same to a series of rollers 161 constituting a gravity conveyor. These rollers are journaled in a frame 162 pivoted at 163 so that its lower end may be shifted vertically to discharge the descending pallets to any one of the similarly constructed gravity conveyors F, Fig. 1, which as before stated carry the pallets back to the brick machines for re-use. The distributing conveyor or switch 162 is adjusted by means of the counterbalanced linkage 164 provided at the bottom with a handle 165. The latter moves in a vertical slot 166 (Figs. 1ª and 1ᵇ) cut in the plate 167 and provided with lateral recesses 168 in which the rear end of the handle 165 may be engaged to hold the distributing conveyor in one or another of its three upper positions.

At times it may be desirable not to deliver the pallets to the brick machines, but to remove them from the elevator at a convenient point, say a few feet above the ground, for inspection, repair, storage, etc. At other times it may be desirable to supply pallets to the elevator otherwise than by means of the horizontal conveyor 104. To permit these operations the means shown in Figs. 30 to 36 inclusive may be provided. Referring to these figures, 175, 176 designate two vertical guides behind which the pallets move in their upward travel on the conveyor 155. A section is cut out of each of these guides and to the upper ends of the remaining lower portions are hinged two arms 177 connected by cross members 178 to form a gate. In closed position the gate is held by removable pins 179 extending through ears 180 on the arms into the outwardly curved lower ends 181 of the upper sections of the guides. To permit removal or insertion of pallets the gate is swung down and is held in inclined position by two stays 182 having their lower ends notched to engage a cross member 183 on the elevator framework, as in Figs. 33, 34, 35. Two arms 184 are hinged to the upper portions of the guides just above the curved lower portions 181, and have their outer ends bent as indicated at 185. In normal position, Fig. 31, the arms 184 are held up by latches 186 engaging the cross member 187. When pallets are to be inserted the gate 177 is swung down as in Fig. 33, and the short brackets 188 are swung in to the position shown in Figs. 33 and 36, resting on the flange 189. The pallet can then be laid on these brackets, as indicated in dotted lines in the figures mentioned, in the path of the ascending fingers 154 by which they are engaged and carried away. If necessary they can be guided by the hand until their upper edges come behind the curved guides 181, which will then steer them into their proper path. When pallets are to be removed from the elevator the deflecting gate 185—185 is swung down to the position shown in Figs. 34 and 35 and locked by means of the pins 179. At the same time the brackets 188 are left in or swung out to the positions indicated in Fig. 34. Now pallets ascending on the conveyor 155 strike the deflector 185 and are thrown out, as illustrated in Fig. 34, upon the shelf 177 where they can be readily seized and removed.

The driving instrumentalities are illustrated in Fig. 3. An electric motor 200 drives, through pinion 201 and gear 202, a set of bevel gears 203 which in turn drive the shaft 176. The latter, as previously stated, transmits motion to the cleaning brushes 120, 121. The motor 200 also drives a pinion 204 and thence, through gearing 205, drives the shaft 57 on which the outer conveyor sprockets 55 are fixed. To avoid damage in case of a jam on the conveyor or elsewhere the shaft 57 is made in two parts (Fig. 4) on the abutting ends of which are keyed two collars 206 provided with arms 207 connected by a breaking-pin 208. On predetermined overload the pin breaks, whereupon the right hand portion of shaft 57 and all the parts actuated thereby are disconnected from the driving motor, as will be readily understood. The pin is held in place by removable clips 209.

Between gears 202 and 204 (Fig. 3) is a clutch 210, controlled by a link 211 and lever 212 in position convenient to the operator standing near the unloader, so that he can at any time disconnect from the motor all the parts driven through the gear 204.

The elevator conveyor is actuated from the shaft of gear 213 (Fig. 3) by a sprocket chain 214 driving the shaft 215 which in turn drives a transverse shaft 216 through bevel gears 217. At the other end of shaft 216 are bevel gears 218 actuating a vertical shaft 219, and at the top of the latter (Fig. 7) are bevel gears 220 driving the shaft 221 on which are fixed the upper elevator sprockets 222, Figs. 29 and 30.

The horizontal pallet conveyor 104, Fig. 24, is driven by the sprocket 107, on shaft 216, which, as stated above, is actuated by the bevel gears 217, Fig. 3.

The transfer belt 84, Fig. 3, is driven by a separate motor 230, through the medium of pulleys 231, 232, and a belt 233. Conveyor 85 may be driven from motor 210 or motor 230, but is preferably actuated by an independent source of power, not shown, so that even after all the rest of the apparatus stops, bricks already on the conveyor 85 can be carried to their destination.

It is to be understood that the invention is not limited to the specific devices herein illustrated and described but can be embodied in other forms without departure from its spirit.

We claim:

1. In an apparatus for the purpose described, in combination, a vertical conveyer adapted to receive brick-laden pallets, a horizontal conveyer arranged to receive the brick-laden pallets from the vertical conveyer, means cooperating with the pallets to loosen the bricks thereon while the pallets are being transported by the said horizontal conveyer, a conveyer adapted to receive the loosened bricks, a conveyer adapted to receive the unloaded pallets and carry the same away, means for cleaning the pallets while in transit on the latter conveyer, an elevator to receive the cleaned pallets and carry the same to an elevated position, automatic driving mechanism for operating said conveyers and elevator to operate in harmony with each other, and a gravity conveyer to receive pallets at said elevated position and deliver the same to a reloading point.

2. In an apparatus for the purpose described, in combination, a vertical conveyer adapted to receive brick-laden pallets, a horizontal conveyer arranged to receive the brick-laden pallets from the vertical conveyer, means cooperating with the pallets to loosen the bricks thereon while the pallets are being transported by the said horizontal conveyer, a conveyer adapted to receive the loosened bricks, a conveyer adapted to receive the unloaded pallets and carry the same away, means for cleaning the pallets while in transit on the latter conveyer, an elevator to receive the cleaned pallets and carry the same to an elevated position, mechanisms for causing the conveyers and elevator to operate in harmony with each other, and a gravity conveyer to receive pallets at said elevated position and deliver the same to a reloading point.

3. In an apparatus for the purpose described, in combination, a vertical conveyer adapted to receive brick-laden pallets, a horizontal conveyer arranged to receive the brick-laden pallets from the vertical conveyer, means cooperating with the pallets to loosen the bricks thereon while the pallets are being transported by the said horizontal conveyer, a conveyer adapted to receive the loosened bricks, a conveyer adapted to receive the unloaded pallets and carry the same away, an elevator to receive the pallets from the latter conveyer and carry the same to an elevated position, and a gravity conveyer to receive pallets at said elevated position and deliver the same to a reloading point.

4. In an apparatus for the purpose described, in combination, a horizontal conveyer arranged to receive brick-laden pallets, means cooperating with the pallets to loosen the bricks thereon while the pallets are being transported by the said horizontal conveyer, a conveyer adapted to receive the loosened bricks, a conveyer adapted to receive the unloaded pallets and carry the same away, an elevator to receive the pallets from the latter conveyer and carry the same to an elevated position, and a gravity conveyer to receive pallets at said elevated position and deliver the same to a reloading point.

5. In an apparatus for the purpose described, in combination, a conveyer adapted to receive brick-laden pallets and tilt the same sidewise to discharge the bricks therefrom, means cooperating with the brick-laden pallets while in transit to loosen the bricks thereon before the pallets are tilted, a conveyer arranged to receive the unloaded pallets and carry the same away, and means to receive the pallets from the last-mentioned conveyer and deliver the same to a reloading point.

6. In an apparatus for the purpose described, in combination, a conveyer adapted to receive brick-laden pallets and tilt the same sidewise to discharge the bricks therefrom, means for bumping the brick-laden pallets from below while in transit to loosen the bricks thereon before the pallets are tilted, and a conveyer arranged to receive the unloaded pallets and carry the same away.

7. In an apparatus for the purpose described, in combination, a conveyer adapted to receive brick-laden pallets, means for bumping the brick-laden pallets from below while in transit to loosen the bricks thereon, a conveyer to receive the loosened bricks from the pallets, and a conveyer adapted to receive the unloaded pallets and carry the same away.

8. In an apparatus for the purpose described, in combination, a conveyer adapted to receive brick-laden pallets and carry the same to a discharge point, a hammer below the conveyer to bump the pallets on the underside as they pass to loosen the bricks thereon, means at the discharge point to receive the bricks from the pallets, and a conveyer arranged to receive the unloaded pallets and carry the same away.

In testimony whereof we hereto affix our signatures.

FREDERICK A. SCHROEDER.
HERMAN R. SMITH.